United States Patent
Yamada et al.

(10) Patent No.: US 7,301,669 B1
(45) Date of Patent: Nov. 27, 2007

(54) COLOR PRINTING APPARATUS

(75) Inventors: Toshiyuki Yamada, Hadano (JP);
Hiroyuki Abiru, Hadano (JP); Shiro Kofuji, Hadano (JP); Naoyuki Urata, Hadano (JP); Hitoshi Tamura, Hitachi (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 1077 days.

(21) Appl. No.: 09/648,613

(22) Filed: Aug. 28, 2000

(51) Int. Cl.
*G06F 15/00* (2006.01)
*C09B 62/32* (2006.01)

(52) U.S. Cl. .................. 358/1.9; 358/1.9; 358/3.06; 534/635

(58) Field of Classification Search ............... 358/462, 358/2.1, 1.9, 529, 530, 3.03, 3.06, 526; 382/173–176, 382/164; 347/19; 534/635, 638
See application file for complete search history.

(56) References Cited

U.S. PATENT DOCUMENTS

| | | | | |
|---|---|---|---|---|
| 5,526,445 | A | * | 6/1996 | Smutek et al. ............... 382/237 |
| 5,729,663 | A | * | 3/1998 | Lin et al. ...................... 358/1.9 |
| 5,745,657 | A | * | 4/1998 | Barry et al. ................... 358/1.2 |
| 5,963,714 | A | * | 10/1999 | Bhattacharjya et al. ....... 358/1.9 |
| 6,137,589 | A | * | 10/2000 | Obrador et al. ............. 358/1.16 |
| 6,678,426 | B1 | * | 1/2004 | Bearss et al. ................ 382/299 |

FOREIGN PATENT DOCUMENTS

| | | |
|---|---|---|
| EP | 02295766 | 12/1990 |
| EP | 0945780 | 9/1999 |
| JP | 6-284272 | 10/1994 |
| JP | 8-174919 | 7/1996 |
| JP | 9-27907 | 1/1997 |
| JP | 9-130594 | 5/1997 |
| JP | 10-108025 | 4/1998 |
| JP | 11-242578 | 9/1999 |
| JP | 11-254760 | 9/1999 |

* cited by examiner

*Primary Examiner*—King Y Poon
*Assistant Examiner*—Saeid Ebrahimi
(74) *Attorney, Agent, or Firm*—Mattingly, Stanger, Malur & Brundidge PC (57) ABSTRACT

A color printing apparatus includes a printer driver for receiving a print instruction of print data issued from an application program, and for rasterizing the print data to produce con-tone/multi-bits bitmap data and bi-tone/single-bit bitmap data; a page memory for independently storing thereinto both the con-tone/multi-bits bitmap data and the bi-tone/single-bit bitmap data; a control unit for executing a control operation in such a manner that the con-tone/multi-bits bitmap data is converted into con-tone/multi-bits print data, the bi-tone/single-bit bitmap data is converted into bi-tone/single-bit print data, and at least one of the con-tone/multi-bits print data-and the bi-tone/single-bit print data is stored into the page memory in a bitmap format; and an output control unit for reading at least any one of the con-tone/multi-bits print data and the bi-tone/single-bit print data from the page memory, and for logically synthesizing the print data with each other to output the synthesized print data to a color printing unit, reducing the data amount of the bitmap data.

11 Claims, 6 Drawing Sheets

COLOR PRINTING APPARATUS

BACKGROUND OF THE INVENTION

1. Field of the Invention

The present invention is generally related to a color printing apparatus, or a color printing system, and more specifically, is directed to a print data control.

2. Description of the Related Art

There are a color printing apparatus and a color printing system, capable of performing a color printing operation.

That is, for instance, an upper-grade apparatus such as a personal computer rasterizes print data constructed of characters/figures/images as multi-bits bitmap data indicated by color values of the respective primary colors, i.e., R(red), G(green), and B(blue) colors. Then, the rasterized bitmap data is transferred to a color printer control apparatus, while the bitmap data of RGB colors is directly sent or is converted into bitmap data of CMYK (cyan, magenta, yellow, black) colors corresponding to the primary colors printed by a color printer. In the color printer control apparatus, the received multi-bits bitmap data is converted into the color values of the primary colors CMYK printed by the color printer apparatus, and since the color printer control apparatus increases/decreases amounts of ink and/or toners adhered onto a printing paper in response to the color values of CMYK colors, the color printing operation is carried out. In particular, JP-A-5-83540 discloses the following techniques. That is, the black character/black line image portion is extracted from the print data in which the color image data are mixed with the black/white data such as characters and lines. While this dot is set to the maximum value of K(black) color and CMY colors (three primary colors) are set to 0, the black character black line image portion is printed out by employing only the K ink, whereas the portion other than the black character/black line image portion is printed out after the color correction process operation is carried out. As a consequence, it is possible to avoid lowering of the printing qualities, for example, color shifts and lowering of resolution.

However, the above-described printing technique does not consider lowering of the printing performance in such a case that since the print data is sent as the con-tone/multi-bits bitmap data from the upper-grade apparatus to the color printing apparatus, when the information amount of the print data is large, the data sending time is prolonged. Also, in the upper-grade apparatus, the above-explained printing technique owns such a problem that the rasterizing process time used to produce the print data is prolonged. More specifically, in a color printing apparatus and also a color printing system, which are designed to print out a large-sized page in high precision, a data amount of print data is large and thus, printing performance thereof would be lowered. In general, there are many possibilities that print documents are printed out in bi-tone/single bit, in particular, monochrome/single bit. As to color images, there are many possibilities that such a color image is contained in a portion of a document, and/or color images are contained only in several pages among a plurality of document pages. However, the above-described printing technique never considers such various use modes. Since all of these documents are print-processed as the color printing data, this printing technique requires such lengthy printing time.

Also, in the above-described printing technique, the black character/black line image is extracted by the line/image extracting circuit from the print data in which the color image such as natural images is synthesized with the single-bit black/white image data such as characters and line images. However, the black characters of the image area could not be extracted. There has also been another related application, U.S. patent application Ser. No. 09/095,889 filed Jun. 11, 1998 and entitled "Information Printing System" by E. Yoshino, et al.

SUMMARY OF THE INVENTION

The present invention is featured by that color print data is rasterized as con-tone/multi-bits bitmap data and also bi-tone/single-bit bitmap data, which are used as print data. These con-tone/multi-bits bitmap data and bi-tone/single-bit bitmap data are separately stored into a page memory, and then are converted into printing primary colors during print operation. The converted printing primary colors are printed out in the unit of the primary color, and furthermore, are logically calculated every bit so as to synthesize the calculated bitmap data with each other.

As one concrete example, while multi-bits bitmap data of RGB (red, green, blue) are converted into multi-bits bitmap data of CMYK (cyan, magenta, yellow, black) corresponding to the printing primary colors, the single-bit bitmap data of K color is OR-gated with the above-explained converted multi-bits bitmap data of K color every bit, and then the OR-gated bitmap data of K color is outputted during the printing operation of K color. When the printing operation of CMY colors is carried out, the single-bit bitmap data of K color is inverted every bit in such a manner that the multi-bits bitmap data of CMY colors are masked by the single-bit bitmap data of K color. Then, the inverted single-bit bitmap data of K color is AND-gated by the multi-bits bitmap data of CMY colors to output the AND-gated multi-bits bitmap data of CMY colors.

Furthermore, when con-tone/multi-bits print data is stored into a page memory, bi-tone/single-bit bitmap data stored at the bit position corresponding thereto is set to non-print data.

As a result, as one example, even as to a black character and a black line image located in a color image area, it can avoid such a problem that the black color is mixed with the primary colors other than this black color, and thus, the printing quality can be improved.

Also, lowering of the above-explained printing performance can be solved as follows:

The storage area of the image memory for storing thereinto the bi-tone/single-bit bitmap data and the con-tone/multi-bits bitmap data is subdivided into a plurality of storage areas. The information indicative of the storage areas is added to the print data which is sent out from the upper-grade apparatus to the color printing apparatus, and the print data with this storage area information is sent out in combination with the rasterized bi-tone/single-bit bitmap data and the con-tone/multi-bits bitmap data. Then, the rasterized print data is stored into the designated area of the designated page memory. It is so assumed that the area into which the print data is not stored is used to store the non-print data.

When the printing operations is carried out, a judgement is made as to whether or not both the con-tone/multi-bits bitmap data and the bi-tone/single-bit bitmap data, which are stored in the page memory, are required to be printed out, and then, only such bitmap data to be printed is outputted to the color printing unit. As one concrete example, such a judgement is made as to whether or not the multi-bits bitmap data of RGB and the bi-tone/single-bit bitmap data of the page memory are present. In such a case that the print data of the bi-tone/single-bit is effective, only the print data or k color among the printing primary colors of CMYK is printed out.

Also, resolution of the con-tone/multi-bits print data has a different value from resolution of the bi-tone/single-bit print data. In other words, while the resolution of the bi-tone/single-bit print data is made equal to the output resolution, the resolution of the con-tone/multi-bits print data is made equal to 1/n of the resolution of the bi-tone/single-bit print data. When the printing operation is carried out, the con-tone/multi-bits bitmap data is multiplied by "n", and then the n-multiplied con-tone/multi-bits bitmap data is logically synthesized with the bi-tone/single-bit bitmap data to output the synthesized bitmap data.

With employment of the above-explained means, the information amount of the print data can be reduced, and the useless printing operation is not carried out, so that the printing performance is not lowered.

BRIEF DESCRIPTION OF THE DRAWINGS

A more better understanding of the present invention is made by reading a detailed description in conjunction with the accompanying drawings, in which.

DETAILED DESCRIPTION OF THE EMBODIMENT

Referring now to drawings, an embodiment of the present invention will be described in detail. It should be noted that in this embodiment, the present invention is described in the form of a color printer control apparatus 101. Alternatively, such an arrangement constituted by combining the color printer control apparatus 101 and a color printer apparatus 102 may be explained as a color printing apparatus of the present invention.

Figure 1:
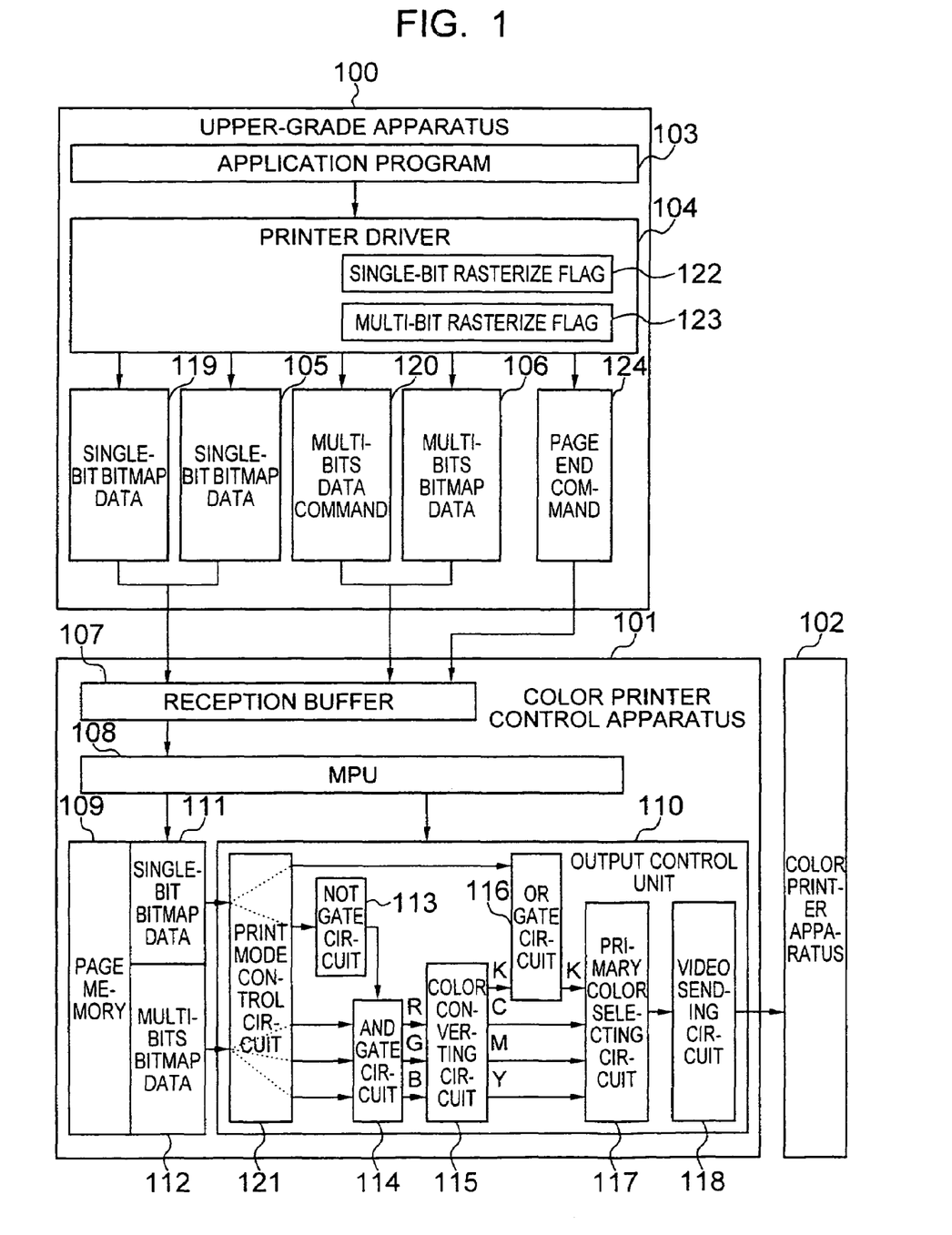
FIG. 1 schematically shows a structural diagram of a color printing apparatus according to an embodiment of the present invention.

FIG. 1 schematically indicates an example of an apparatus which constitutes a color printing system according to an embodiment of the present invention. This color printing system is arranged by an upper-grade apparatus 100, a color printer control apparatus 101, and a color printer apparatus 102. In this drawing, there is shown a major arrangement as to the color printer control apparatus 101. The color printer apparatus 102 is, for instance, a color laser printer.

In the upper-grade apparatus 100, an application program 103 transfers print data such as character/figure (drawing)/image data to a printer driver 104 so as to instruct the printing operation. When the printer driver 104 receives the print instruction issued from the application program 103, this printer driver 104 rasterizes the transferred print data so as to form bitmap data. At this time, in the case that the color of the character/figure/image data to be rasterized is black, the printer driver 104 forms single-bit bitmap data 105, whereas in the case that the color of the character/figure/image data is chromatic colors other than black, the printer driver 104 forms multi-bits bitmap data 106. The color information is contained in the character/figure/image data transferred from the application program 103. In the case that color values of R(red), G(green), and B(blue) are defined as R=0, G=0, and B=0, a black color is represented.

In this example, it is now assumed that multi-bits bitmap data is formed by using primary colors of R, G, B, and color values of the respective colors are selected to be "0" to "255". For instance, when the print data corresponds to bitmap data 200 to 202 shown in FIG. 2, it is so assumed that the printer driver 104 rasterizes this print data to produce both single-bit bitmap data 205 and multi-bits bitmap data 208. When a completion of rasterizing operation for print data in unit of one page is notified from the application program 103, the printer driver 104 sends out the formed bitmap data to the color printer control apparatus 101. In such a case that the printer driver 104 sends out the single-bit bitmap data 105, this printer driver 104 adds thereto a single-bit data command 119 capable of discriminating such a fact that this sent print data corresponds to the single-bit bitmap data, whereas in such a case that the printer driver 104 sends out the multi-bits bitmap data 105, this printer driver 104 adds thereto a multi-bits data command 120 capable of discriminating such a fact that this sent print data corresponds to the multi-bits bitmap data. Then, the printer driver 104 supplies the resulting print data with the data command to the color printer control apparatus 101.

Alternatively, as to such bitmap data which has not yet been rasterized, a rasterize flag may be provided in order to recognize as to whether or not rasterized print data is present. As a result, it is readily possible not to send out such bitmap data without the rasterized print data to the color printer control apparatus 101. For instance, when the printer driver 104 receives the print operation instructed from the application program 103, while both the single-bit rasterize flag 122 and the multi-bits rasterize flag 123 are initialized as values capable of discriminating "no data", in the case that the print data whose character/figure/image data color is black is rasterized as the single-bit bitmap data, the printer driver 104 sets a value capable of discriminating "data is present" to the single-bit rasterize flag 122. When the print data whose character/figure/image data color is any color other than black color is rasterized, the printer driver 104 sets a value capable of discriminating "data is present" to the multi-bits rasterize flag 123.

When bitmap data is sent out to the color printer control apparatus 101, the printer driver 104 may transfer such a bitmap data which indicates "data is present" by using either the single-bit rasterize flag 122 or the multi-bits rasterize flag 123 to the color printer control apparatus 101, whereas the printer driver 104 may not transfer such a bitmap data which represents "no data" to the color printer control apparatus 101. Furthermore, when the bitmap data in the unit of one page is sent out to the color printer control apparatus 101, the printer driver 104 transfers a page end command 124 to the color printer control apparatus 101. In the color printer control apparatus 101, the print data received from the upper-grade apparatus 100 is stored into a reception buffer 107. An MPU (microprocessor unit) 108 reads out a command from the reception buffer 107 so as to discriminate that the bitmap data corresponds to the single-bit bitmap data, or the multi-bits bitmap data, and then stores he discriminated bitmap data into a page memory 109. Upon detection of the page end command 124, the MPU 108 initiates an output control unit 110 so as to convert the bitmap data stored in the page memory 109 into video signals made of the respective primary colors CMYK, and then, supplies these converted video signals to the color printer apparatus 102. The color printer apparatus 102 prints in response to the video signal sent from the color printer control apparatus 101.

The output control unit 110 owns a function capable of synthesizing the single-bit bitmap data 111 with the multi-bits bitmap data 112, which are stored in the page memory 109; another function capable of converting RGB data into CMYK data; and also another function capable of extracting primary color data to be sent to the color printer apparatus 102 to thereby convert the extracted primary color data into video signals which will be sent out. In other words, the single-bit bitmap data 111 is synthesized with the multi-bits bitmap data 112 by employing a NOT gate circuit 113, an AND gate circuit 114, and an OR gate circuit 116. The RGB data is converted into the CMYK data by a color converting circuit 115, and then, a primary color selecting circuit 117 extracts the primary color data from the CMYK data, which are supplied to the color printer apparatus 102. A video sending circuit 118 converts the extracted primary color data into the video signal and then sends out the converted video signal to the color printer apparatus 102.

In a so-called "intermediate transfer type color laser printer", since toners having primary colors CMYK are sequentially adhered to an intermediate transfer drum so as to print out a color image, the bitmap data stored in the page memory 109 are read out 4 times in correspondence with the respective primary color outputs of CMYK. The MPU 108 controls the primary color selecting circuit 117 of the output control unit 110 to sequentially select the primary color data to be outputted, so that the video signal having the relevant color is outputted.

Figure 2:
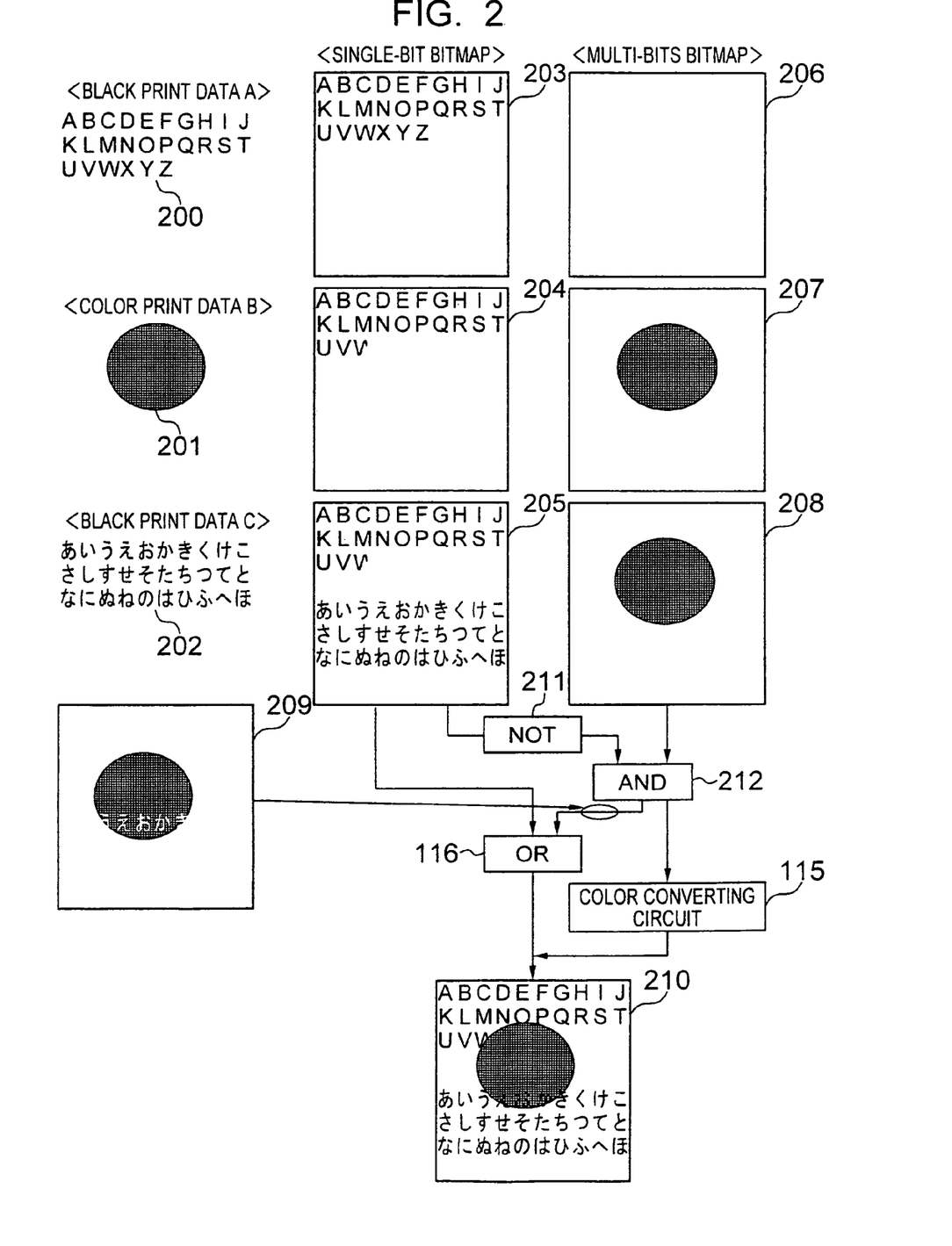
FIG. 2 is an explanatory diagram for explaining a forming operation and a synthesizing operation of bitmap data according to the present invention.

It is now assumed that the synthesizing operation between the single-bit bitmap data 111 and the multi-bits bitmap data 112 is carried out as shown in FIG. 2. That is, for example, assuming now that both the single-bit bitmap data 111 and the multi-bits bitmap data 112, which are stored in the page memory 109, are equal to both single-bit bitmap data 205 and multi-bits bitmap data 208 indicated in FIG. 2, the output of the AND gate circuit 114 becomes multi-bits bitmap data 209 shown in FIG. 2, and then, a printout result 210 is obtained by both bitmap data of K(black) color synthesized with the above-described multi-bits bitmap data 209 and bitmap data of CMY (cyan, magenta, and yellow) colors equal to the output of the color converting circuit 115 by the OR gate circuit 116.

Also, depending upon a page to be printed out, there is such a case that a page is printed out by using only single-bit bitmap data. Further, there is another case that a page is printed out by employing only multi-bits bitmap data. While the MPU 108 controls the print mode control circuit 121, this print mode control circuit 121 may synthesize the single-bit bitmap data with the multi-bits bitmap data to output print data made of the synthesized bitmap data, may output print data made of only the single-bit bitmap data, or may output print data made of only the multi-bits bitmap data. In other words, when the print mode control circuit 121 is set to such a print mode that the print data made of only the single-bit bitmap data is outputted, the multi-bits bitmap data is not read out, but outputs such print data in such a way that the input of the AND gate circuit 114 becomes white data (R=255, G=255, B=255). Also, when the print mode control circuit 121 is set to such a print mode that the print data made of only the multi-bits bitmap data is outputted, the print mode control circuit 121 does not read the single-bit bitmap, data, but outputs such print data that the inputs of the NOT gate circuit 113 and the OR gate circuit 116 become white data "0." As previously described, while the print data of the character/figure/image data whose color is black is rasterized as the single-bit bitmap data and also the color data other than black color data are rasterized as the multi-bits bitmap data, the single-bit bitmap data is synthesized with the multi-bits bitmap data during the printing operation to print out. As a result, it is possible to shorten the process time required to rasterize the print data of the character/figure/image data whose color is black, and therefore, the printing performance can be improved. Also, even when color document data made of plural pages is printed in the color print mode, if there are such pages made of the print data of the character/figure/image data whose color is black, then neither the multi-bits bitmap data is rasterized, nor the multi-bits bitmap data is transferred from the upper-grade apparatus 100 to the color printer control apparatus 101. In such a color document, the data processing performance can be improved, and also the information amount to be processed can be decreased, so that the printing operation can be carried out in a high efficiency.

Figure 3:
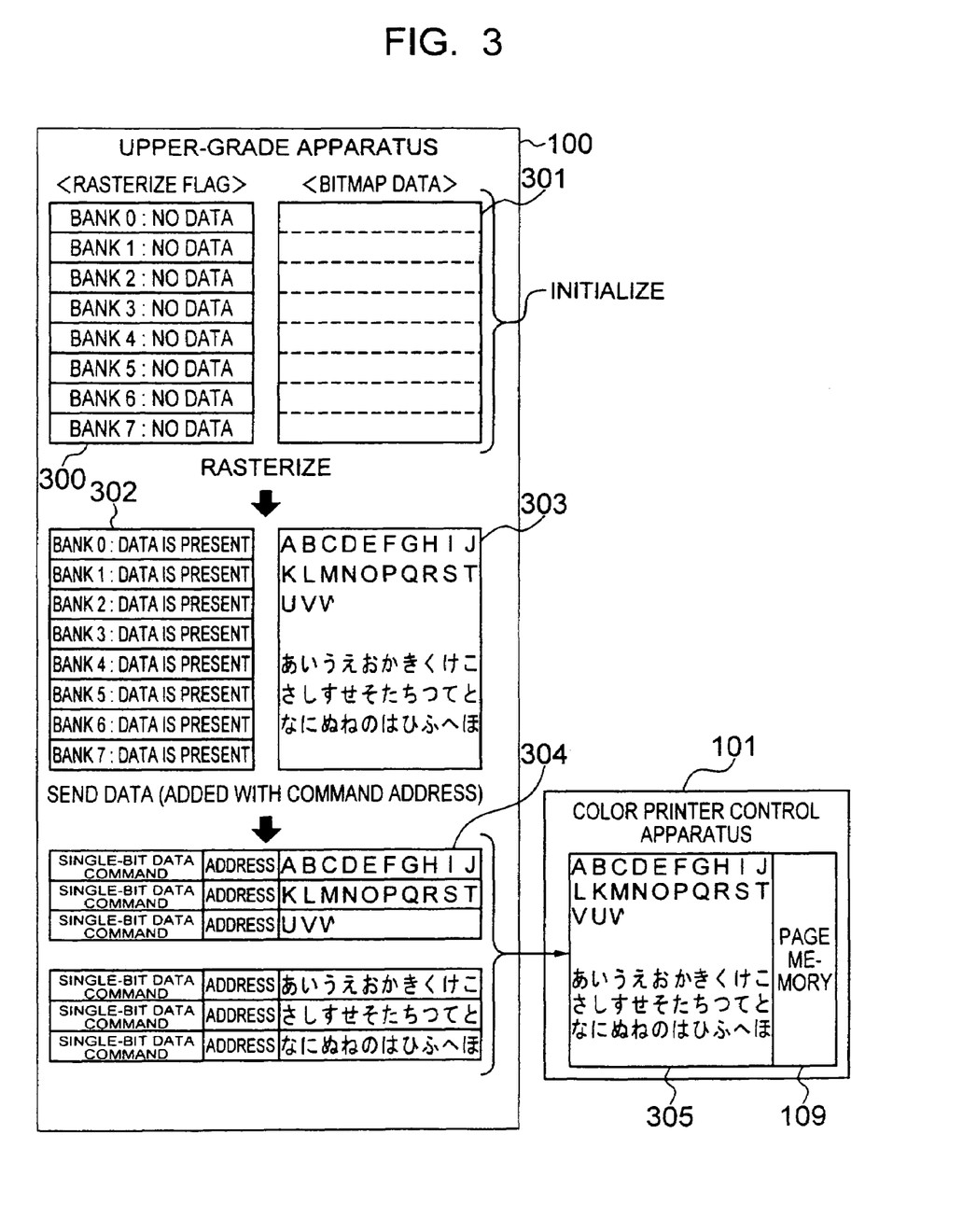
FIG. 3 is an explanatory diagram for describing a sending operation of only rasterized single-bit bitmap data.
Figure 4:
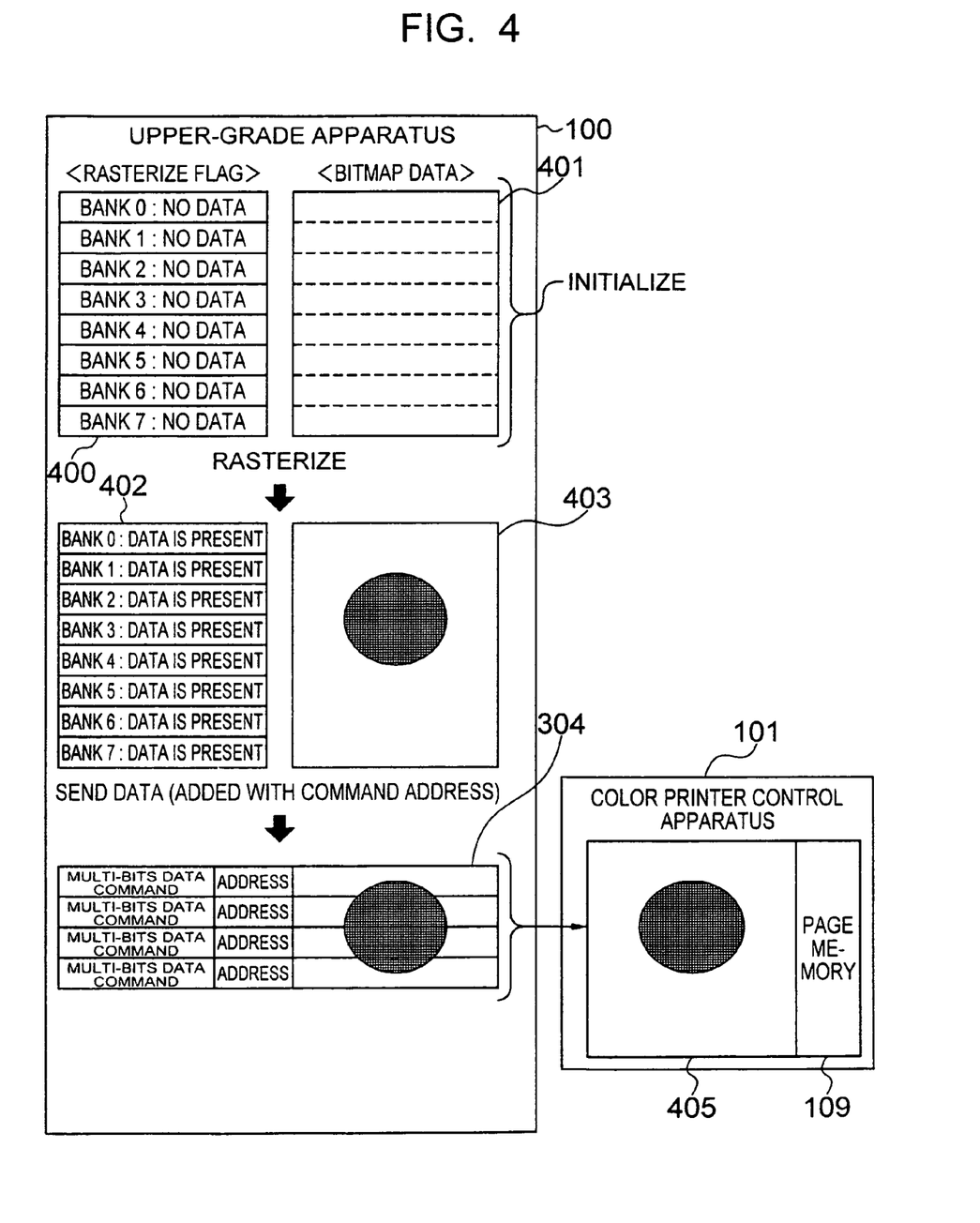
FIG. 4 is an explanatory diagram for describing a sending operation of only rasterized multi-bits bitmap data.

Next, an example of a color printing system will now be explained with reference to FIG. 3 and FIG. 4. That is, in the color printing system in which bitmap data is formed by the upper-grade apparatus 100 and then the formed bitmap data is sent to the color printer control apparatus 101 so as to color-print, the entire data of this bitmap data is not sent to the color printer control apparatus 101, but only such a rasterized bitmap data portion is sent to the color printer control apparatus 101, while address information is added thereto, so that the overall bitmap data is formed by the color printer control apparatus 101 to perform the color printing operation. FIG. 3 illustratively represents both a rasterizing operation of single-bit bitmap data and a data transfer operation, whereas FIG. 4 illustratively shows a rasterizing operation of multi-bits bitmap data and a data transfer operation. The upper-grade apparatus 100 manages as to whether or not such a print data is present in which, for example, bitmap data for 1 page is subdivided into 8 banks and these divided bitmap data are rasterized. Also, the upper-grade apparatus 100 manages as to whether or not the bitmap data rasterized every bank is present, while rasterize flags with respect to the respective banks "0" to "7" are provided as to a single-bit rasterize flag 300 and a multi-bits rasterize flag 400. For example, in the printer driver 104 of the upper-grade apparatus 100, upon receipt of a print instruction issued from the application program 103, both the overall single-bit bitmap data 301 and the overall multi-bits bitmap data 401 are set to "white" (namely, single-bit bitmap data is set to "0" and multi-bits bitmap data is set to R=255, G=255, B=255) in order to rasterize the print data, namely initializing process operation. Also, this printer driver 104 sets "no data" with respect to all of the banks of both the single-bit rasterize flag 300 and the multi-bits rasterize flag 400. When the print data is rasterized, the printer driver 104 updates the rasterize flag of the relevant bank of the bit map data as "data is present." For instance, if the print data are 200 to 202 shown in FIG. 2, the single-bit rasterize flag 300 and the multi-bits rasterize flag 400 are updated as indicated as "302" and "402", respectively. When the rasterizing operation of the print data for 1 page is accomplished, only the bitmap data of "data is present" of the rasterize flag is added as address information to the single-bit data command and the multi-bits data command, and data indicated as "304" and "404" are sent to the color printer control apparatus 101. In the color printer control apparatus 101, the received data is analyzed, either the single-bit bitmap data or the multi-bits bitmap data is stored at the instructed address of the page memory 109. Also, the bitmap data is set to such a portion corresponding to the not-received bank, so that both single-bit bitmap data 305 and multi-bits bitmap data 405 are formed.

The formed bitmap data 305 and the formed bitmap data 405 are printed out by synthesizing the single-bit bitmap data with the multi-bits bitmap data as indicated in FIG. 1. As previously explained, the overall bitmap data which are rasterized by the upper-grade apparatus 100 are not sent out to the color printer control apparatus 101, but only the rasterized bitmap data portion is sent out, so that the information amount which is transferred from the upper-grade apparatus 100 to the color printer control apparatus 101 can be reduced. As a consequence, the time required for sending out the bitmap data can be shortened, and the printing performance can be improved.

Also, in such a case that bitmap data is coded so as to compress the information amount thereof and then the coded bitmap data is transferred from the upper-grade apparatus 100 to the color printer control apparatus 101, the entire data of this bitmap data is not coded, but only the rasterized data portion is merely coded. As a result, the process operation required to code the rasterized bitmap data portion can be shortened, and therefore, the print performance can be improved. In particular, there are many possibilities in a color document that print data of character/figure/image data whose color is black is printed on an area (for example, bank) different from another area where print data whose color is any color other than black color is printed. As a result, only the rasterized data portion may be sent out, and/or may be encoded. Thus, it is expectable that both the data transfer time and the encoding process time may be reduced to improve the printing performance in the color document.

Figure 5:
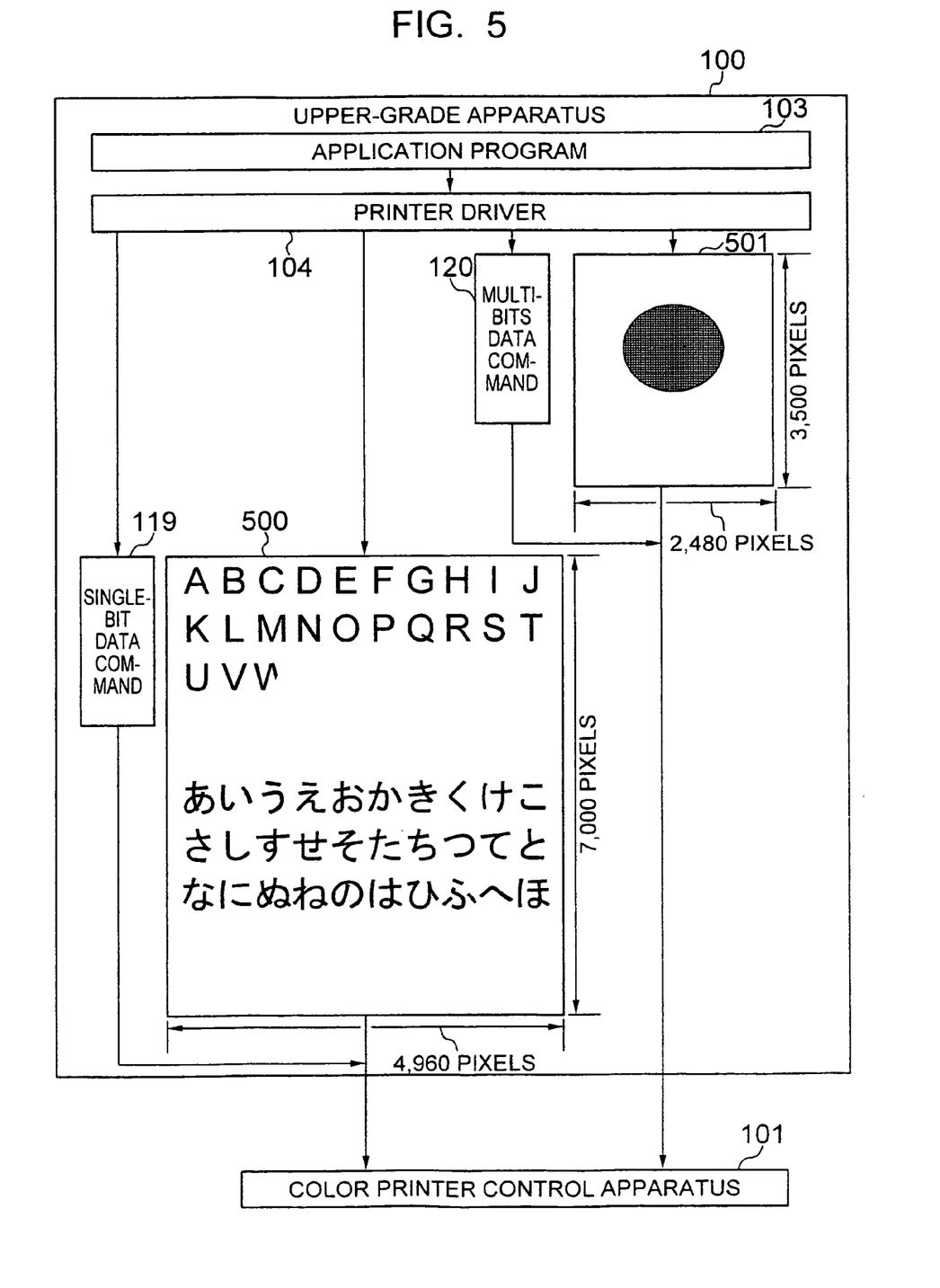
FIG. 5 is an explanatory diagram for explaining a printing operation of single-bit bitmap data, the resolution of which is increased.
Figure 6:
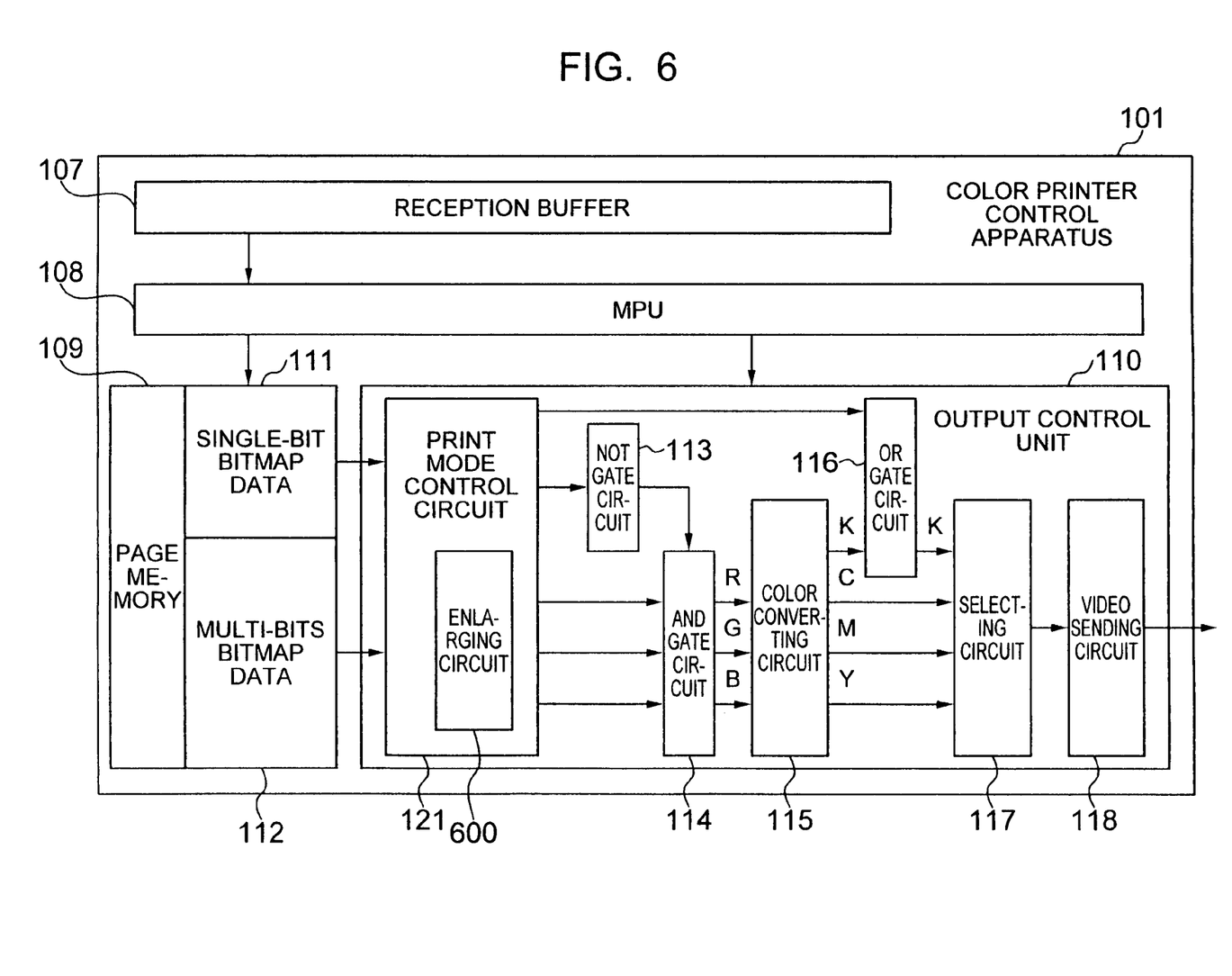
FIG. 6 schematically represents a structural diagram of a color printing apparatus according to another embodiment of the present invention.

Referring now to FIG. 5 and FIG. 6, a description will be made of a color printing system capable of improving a printing quality in accordance with the below-mentioned color printing operation. That is, resolution of single-bit bitmap data is increased and the resolution-increased bitmap data is rasterized, whereas multi-bits bitmap data is rasterized with 1/n resolution of that of the single-bit bitmap data. When the printing operation is carried out, this resolution of the multi-bits bitmap data is converted into such resolution equal to the above-described resolution of the single-bit bitmap data, and then the single-bit bitmap data is synthesized with the multi-bits bitmap data to perform the color printing operation. For example, in FIG. 5 and FIG. 6, there is shown such a color printing system that with respect to print data of A4-sized paper, such print data of character/figure/image data whose color is black is rasterized as single-bit bitmap data of 600 dpi, whereas print data whose color is any color other than black color is rasterized as multi-bits bitmap data of 300 dpi. When the color printing operation is carried out, this single-bit bitmap data of 600 dpi is synthesized with the multi-bits bitmap data of 300 dpi.

In the upper-grade apparatus 100, upon receipt of a print instruction issued from the application program 103, the printer driver 104 rasterizes the print data of the character/figure/image data whose color is black as single-bit bitmap data 500 of 600 dpi, whereas the print data whose color is any color other than black color is rasterized as multi-bits bitmap data 501 of 300 dpi. In this case, when a m/m unit and a point (namely, 1 point=1/72 inches) are quantized as dot numbers of resolution of 600 dpi and 300 dpi, the dot number of 600 dpi is not always equal to two times of the dot number of 300 dpi. The conversion from m/m unit and point into dot numbers of dpi corresponds to such a conversion between different unit systems. Thus, the dot number converted into dpi may contain such an error that small numbers less than a decimal point is rounded with respect to numeral values indicated by m/m unit and point. As a consequence, the following case does not always occur. That is, the dot number converted into resolution of 600 dpi owns an error smaller than that of the dot number converted into resolution of 300 dpi, and the dot number of 600 dpi converted from either m/m unit or point becomes two times larger than the dot number converted into 300 dpi. For example, when 10 points are rounded by cutting off numbers smaller than the decimal point, resolution of 600 dpi becomes 83 dots and resolution of 300 dpi becomes 41 dots. To solve this error aspect, the conversion from either m/m unit or point into 600 dpi may be carried out in such a manner that dot number of 300 dpi is calculated from either m/m unit or point, and then the calculated dot number is multiplied by two. As previously described, the color printing operation is carried out as follows. That is, both the single-bit bitmap data of 600 dpi and the multi-bits bitmap data of 300 dpi, which are rasterized in the upper-grade apparatus 100, are sent to the color printer control apparatus 101. In this color printer control apparatus 101, the multi-bits bitmap data is enlarged two times along both a main scanning direction (lateral direction) and a sub-scanning direction (longitudinal direction) so as to become such bitmap data having the same size as that of 600 dpi. When the multi-bits bitmap data of 300 dpi is enlarged, various methods may be performed. That is, when the MPU 108 stores the multi-bits bitmap data of 300 dpi into the page memory, this multi-bits bitmap data may be enlarged two times along the lateral and longitudinal directions and then the enlarged bitmap data may be stored into the page memory. Alternatively, while an enlarging circuit 600 is added to the print mode control circuit 121, the multi-bits bitmap data read out from the page memory 109 may be enlarged two times along both the lateral and longitudinal directions, so that the input data to the AND gate circuit 114 may become multi-bits bitmap data of 600 dpi. If the input data to the AND gate circuit 114 becomes the multi-bits bitmap data of 600 dpi, as previously explained in connection with FIG. 1, then this multi-bits bitmap data of 600 dpi is synthesized with the single-bit bitmap data of 600 dpi, and thus, the video signal having resolution of 600 dpi may be sent to the color printer apparatus 102 so as to perform the color printing operation.

As previously explained, while the print data of the character/figure/image data whose color is black is rasterized as the single-bit bitmap data having the high resolution and also the print data whose color is any color other than black color is rasterized as the multi-bits bitmap data having the 1/n resolution lower than that of the multi-bits bitmap data, the resolution of the multi-bits bitmap data is converted into that of the single-bit bitmap data to print out during the printing operation. As a consequence, while the increasing of the information amount is suppressed, the print qualities of the black characters and the black lines can be improved.

As previously explained, such a color printing system has been described as one embodiment of the present invention, in which the bitmap data is produced in the upper-grade apparatus 100, and then the produced bitmap data is supplied to the color printer control apparatus 100 so as to perform the color printing operation. The present invention may be similarly realized by way of the following printing method. That is, while print data constructed of characters/figures/images is sent out from the upper-grade apparatus 100 to the color printer control apparatus 101, the print data received by the color printer control apparatus 101 is rasterized to form the bitmap data.

What is claimed is:

1. A color printing apparatus for printing by mixing a plurality of primary colors, comprising:
   a printer data receiver for receiving a print instruction of print data issued from an application program, and for rasterizing said print data to separately receive con-tone/multi-bits bitmap data and bi-tone/single-bit bitmap data, respectively both made up of said print data, from a high-ordered apparatus;
   a page memory for independently storing thereinto both said con-tone/multi-bits bitmap data and said bi-tone/single-bit bitmap data;
   a control unit for executing a control operation in such a manner that said con-tone/multi-bits bitmap data is converted into con-tone/multi-bits print data, said bi-tone/single-bit bitmap data is converted into bi-tone/single-bit print data, and at least one of said con-tone/multi-bits print data and said bi-tone/single-bit print data is stored into said page memory in a bitmap format; and
   an output control unit for reading at least any one of said con-tone/multi-bits print data and said bi-tone/single-bit print data from said page memory, and for logically synthesizing said print data with each other to output the synthesized print data to a color printing unit,
   wherein said control unit designates resolution of said bi-tone/single-bit bitmap data as first resolution equal to the output resolution of the color printing unit, and designates resolution of said con-tone/multi-bits bitmap data as second resolution equal to 1/n of said first resolution, and also stores both said bi-tone/single-bit bitmap data and said con-tone/multi-bits bitmap data into said page memory; and
   said output control unit includes an enlarging circuit for enlarging said con-tone/multi-bits bitmap data having said second resolution to said first resolution to logically synthesize said enlarged con-tone/multi-bits bitmap data and said bi-tone/single-bit bitmap data and output synthesized bitmap data to the color printing unit.

2. A color printing apparatus as claimed in claim 1 wherein,
   said printer data receiver receives a multi-bits rasterize flag for indicating that said con-tone/multi-bits bitmap data is rasterized, and also a single-bit rasterize flag for indicating that said bi-tone/single-bit bitmap data is rasterized.

3. A color printing apparatus as claimed in claim 1 wherein,
   said output control unit includes:
   a color converting unit for separating said con-tone/multi-bits bitmap data into a plurality of primary colors; and
   an OR gate circuit for OR-gating bit data of said bi-tone/single-bit bitmap data and said bi-tone/single-bit bitmap data every bit position separated from said con-tone/multi-bits bitmap data by said color converting unit.

4. A color printing apparatus as claimed in claim 3 wherein,
   said output control unit includes,
   an inverting circuit for inverting said bi-tone/single-bit bitmap data every bit; and
   an AND gate circuit for AND-gating said inverted bitmap data and said con-tone/multi-bits bitmap data every bit position.

5. A color printing apparatus as claimed in claim 2 wherein,
   when said con-tone/multi-bits print data is stored into said page memory, said control unit sets the bit position of the bi-tone/single-bit print data within said con-tone/multi-bits print data to non-print data in response to said single-bit rasterize flag.

6. A color printing apparatus as claimed in claim 1 wherein,
   said control unit stores both said bi-tone/single-bit print data and said con-tone/multi-bits print data into plural sub-divided areas of said page memory in the unit of a block based upon address information designated to said print data; and sets said area which is not designated by said address information to a non-print area.

7. A color printing apparatus as claimed in claim 2 wherein,
   said output control unit judges as to whether or not both said con-tone/multi-bits print data and said bi-tone/single-bit print data stored in said page memory are required to be printed out in response to both said single-bit rasterize flag and said multi-bits rasterize flag; and said output control unit outputs only said print data to the color printing unit.

8. A printing system comprised of an upper-grade apparatus for rasterizing print data and a color printing apparatus for printing said rasterized print data by mixing a plurality of primary colors with each other, wherein,
   said upper-grade apparatus includes first means for separately rasterizing said print data as bi-tone/single-bit print data and con-tone/multi-bits print data and second means for supplying at least one of said rasterized bi-tone/single-bit print data and said rasterized con-tone/multi-bits print data to said color printing apparatus, and output means for separately outputting said bi-tone/single-bit print data and con-tone/multi-bits print data; and
   said color printing apparatus includes a page memory for separately storing the entered bi-tone/single-bit print data and the entered con-tone/multi-bits print data in a bitmap data format, and third means for reading said bitmap data from said page memory in the unit of the primary color to print out the read bitmap data,
   wherein said upper-grade apparatus rasterizes in a bitmap format both said bi-tone/single-bit print data having first resolution equal to output resolution of said color printing apparatus and said con-tone/multi-bits print data having second resolution equal to 1/n of said first resolution; and
   said color printing apparatus includes an enlarging circuit for enlarging said con-tone/multi-bits print data having said second resolution to said first resolution, and prints out in accordance with the enlarged con-tone/multi-bits print data and the bitmap data of said bi-tone/single-bit print data.

9. A printing system as claimed in claim 8 wherein,
said first means includes a multi-bits rasterize flag for indicating that said con-tone/multi-bits print data is rasterized, and also a single-bit rasterize flag for indicating that said bi-tone/single-bit print data is rasterized.

10. A printing system as claimed in claim 8 wherein,
said color printing apparatus judges as to whether or not both said con-tone/multi-bits print data and said bi-tone/single-bit print data, which are stored into said page memory in a bitmap format, are required to be printed out to thereby print out at least one of said con-tone/multi-bits print data and said bi-tone/single-bit print data.

11. A printing system as claimed in claim 9 wherein,
said color printing apparatus judges as to whether or not both said con-tone/multi-bits print data and said bi-tone/single-bit data, which are stored into said page memory in a bitmap format, are required to be printed out based upon said single-bit rasterize flag and said multi-bits rasterize flag.

* * * * *

UNITED STATES PATENT AND TRADEMARK OFFICE
CERTIFICATE OF CORRECTION

PATENT NO.        : 7,301,669 B1                                    Page 1 of 1
APPLICATION NO. : 09/648613
DATED             : November 27, 2007
INVENTOR(S)       : T. Yamada et al.

It is certified that error appears in the above-identified patent and that said Letters Patent is hereby corrected as shown below:

ON THE TITLE PAGE

Please insert (30) Foreign Application Priority Data to read as follows:

<u>(30) Foreign Application Priority Data</u>

<u>Nov. 30, 1999 (JP) ..........11-339305</u>

Signed and Sealed this

Thirteenth Day of May, 2008

JON W. DUDAS
*Director of the United States Patent and Trademark Office*